(12) United States Patent
Hodebourg et al.

(10) Patent No.: US 9,732,668 B2
(45) Date of Patent: Aug. 15, 2017

(54) DISCHARGE VALVE AND ASSOCIATED DEVICE

(71) Applicant: Valeo Systemes de Controle Moteur, Cerg Saint Christophe (FR)

(72) Inventors: Grégory Hodebourg, Sartrouville (FR); Sébastien Potteau, Triel sur Seine (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 82 days.

(21) Appl. No.: 14/766,199

(22) PCT Filed: Feb. 5, 2014

(86) PCT No.: PCT/FR2014/050213
§ 371 (c)(1),
(2) Date: Aug. 6, 2015

(87) PCT Pub. No.: WO2014/122394
PCT Pub. Date: Aug. 14, 2014

(65) Prior Publication Data
US 2015/0369120 A1    Dec. 24, 2015

(30) Foreign Application Priority Data

Feb. 7, 2013   (FR) ...................................... 13 51053

(51) Int. Cl.
*F02M 25/07*   (2006.01)
*F02B 37/18*   (2006.01)
(Continued)

(52) U.S. Cl.
CPC ........... *F02B 37/183* (2013.01); *F02M 26/09* (2016.02); *F02M 26/35* (2016.02); *F02M 26/43* (2016.02);
(Continued)

(58) Field of Classification Search
CPC ........ F02M 26/71; F02M 26/09; F02M 26/35; F02M 26/51; F02M 26/43; F02M 26/07;
(Continued)

(56) References Cited

U.S. PATENT DOCUMENTS 4,454,892 A * 6/1984 Chadshay ................ F23K 5/18
137/597
5,443,241 A * 8/1995 Odaira ...................... F01P 7/14
137/625.5
(Continued)

FOREIGN PATENT DOCUMENTS

EP   1 387 058 A2   2/2004
EP   2 172 682 A1   4/2010
FR   2 853 011 A1   10/2004

OTHER PUBLICATIONS

International Search Report issued in corresponding application No. PCT/FR2014/050213 mailed Apr. 23, 2014 (2 pages).

*Primary Examiner* — Hai Huynh
*Assistant Examiner* — Gonzalo Laguarda
(74) *Attorney, Agent, or Firm* — Osha Liang LLP

(57) ABSTRACT

The invention concerns a discharge valve (17) intended to be fitted in a discharge duct of an apparatus designed to be driven by a fluid, in particular a turbocharger driven by the exhaust gases from an engine. The discharge valve (17) comprises a cavity (83) having a first (85), a second (87) and a third aperture (89), each intended to be connected to a respective duct, the discharge valve (17) also comprising first (91) and second (93) means for closing the first (85) and second (87) apertures, respectively, in order to control communication between the ducts.

9 Claims, 7 Drawing Sheets

(51) Int. Cl.
*F16K 11/04* (2006.01)
*F16K 31/12* (2006.01)
*F02M 26/43* (2016.01)
*F02M 26/09* (2016.01)
*F02M 26/35* (2016.01)
*F02M 26/70* (2016.01)
*F02M 26/51* (2016.01)
*F02M 26/69* (2016.01)
*F02M 26/07* (2016.01)

(52) U.S. Cl.
CPC ............ *F02M 26/51* (2016.02); *F02M 26/70* (2016.02); *F16K 11/04* (2013.01); *F16K 31/12* (2013.01); *F02M 26/07* (2016.02); *F02M 26/69* (2016.02); *Y02T 10/144* (2013.01); *Y10T 137/86919* (2015.04)

(58) Field of Classification Search
CPC ...... F02M 26/65; F02M 26/70; F02B 37/183; F16K 11/04; F16K 31/12

USPC ......... 123/568.17, 568.18, 568.11; 60/605.2, 60/600, 602
See application file for complete search history.

(56) References Cited

U.S. PATENT DOCUMENTS

| | | | |
|---|---|---|---|
| 6,006,732 A * | 12/1999 | Oleksiewicz | F02B 75/22 123/568.11 |
| 6,321,537 B1 | 11/2001 | Coleman et al. | |
| 6,330,880 B1 * | 12/2001 | Okada | F02M 26/69 123/568.2 |
| 8,429,892 B2 * | 4/2013 | Tentorio | F02C 7/232 137/112 |
| 2004/0069285 A1 * | 4/2004 | Telep | F02M 26/69 123/568.23 |
| 2007/0084206 A1 * | 4/2007 | Lew | F01N 13/107 60/599 |

* cited by examiner

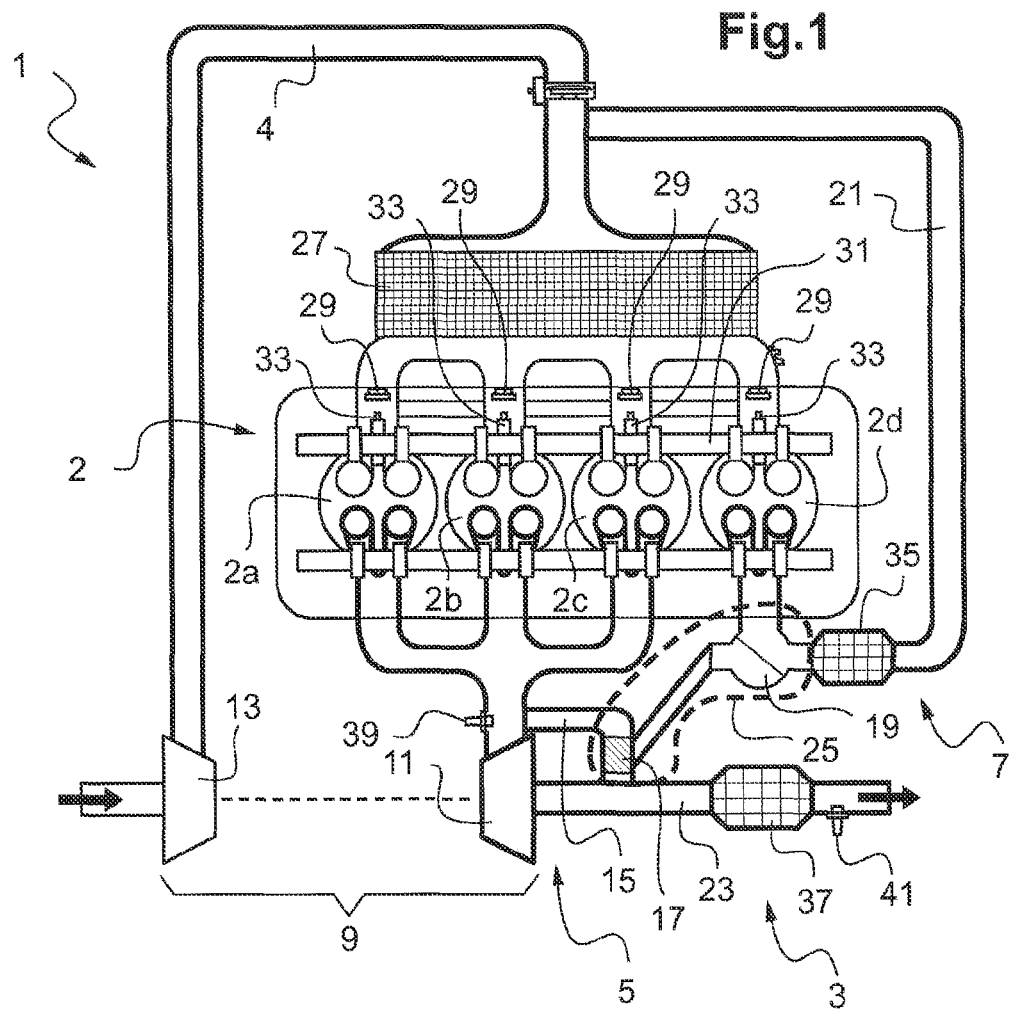
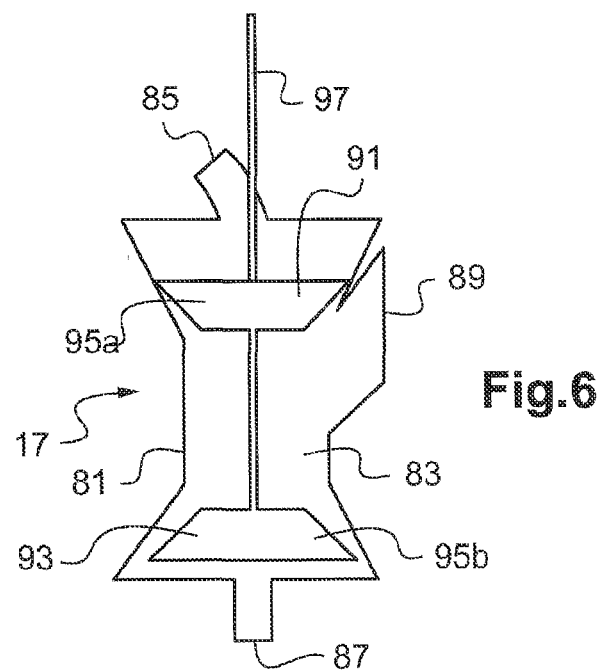

DISCHARGE VALVE AND ASSOCIATED DEVICE

The present invention relates to the field of combustion engines, especially engines intended to drive motor vehicles, equipped with an exhaust gas recirculation circuit and, in particular, engines whose exhaust gas recirculation circuit is applied to at least one dedicated cylinder. In other words, the dedicated cylinder is such that its outlet is connected directly to the inlet of the gas recirculation circuit.

Recirculating a portion of exhaust gases to the air intake, particularly in the case of low engine loads, so as to reduce the amount of polluting emissions or consumption of fuel, is known to the state of the art.

The acceptable limit of the recirculation rate varies for each type of engine (depending on the technology used, the power, the settings . . . ) and according to the engine parameters (speed, temperature, etc.). Exceeding the acceptable limit may result in loss of engine performance, so it is appropriate to modify the recirculation rate regardless of the engine configuration. To that end, it is known to introduce a valve at the intake of the dedicated cylinder. Thus, by forming the valve at the intake of the dedicated cylinder, only the non-dedicated cylinders, that is to say the other cylinders, are used, which allows avoiding the recirculation of gas and therefore the loss of motor performance related to the recirculation. However, the introduction of such valve at the intake of the dedicated cylinder can generate a strong depression at the dedicated cylinder due to the absence of gas at the intake, which may result in pumping losses. Furthermore, if the engine operates with only part of the cylinders, and particularly at cold temperature, this may cause additional vibrations and require adding active damping blocks (silentblocs) and/or resizing the mobile coupling comprising the connecting rods and pistons of the cylinders.

In the case of engines having a turbocompressor, the turbocompressor turbine is driven only by the non-dedicated cylinders of the engine, which may be detrimental to engine performance. Indeed, the turbine cannot benefit from the exhaust gases of the dedicated cylinder to be driven by them.

The object of the present invention is therefore to contribute to solve, at least partially, the aforementioned drawbacks of the state of the art.

The present invention thus relates to a discharge valve for installation in a discharge duct of an apparatus configured to be driven by a fluid, especially from a turbocompressor driven by the exhaust gases of an engine, said discharge valve having a cavity including a first, a second and a third aperture to be connected to a respective duct, the discharge valve also comprising first and second closing means for said first and second apertures, respectively, to control the setting of communication between the ducts. In particular, the first and second closing means allow controlling the setting of communication between the third duct and the other two ducts. This discharge valve thus allows controlling the orientation of the gases at the outlet of the cylinders and managing the driving of the turbocompressor turbine.

The closing means may be fixed on a guide pin configured to be movable in translation between a first closed position of the first aperture by the first closing means, and a second closed position of the second aperture by the second closing means.

The valve may comprise an actuating means of the guide pin, the actuating means being adapted to be rotated and able to convert this rotational movement into a translational movement of the guide pin.

The actuating means may comprise a rod integral with the guide pin and extending, in particular, perpendicularly to the guide pin.

The valve can be arranged so that the rotational driving of the rod causes the translational movement of the guide pin.

The actuating means may comprise an electric engine to drive the rotation of the rod.

The actuating means may comprise a gear system driven in rotation by a pinion of the electric engine and driving the rod in rotation.

The actuating means may comprise a torsion spring for maintaining or returning the rod in a position in which the closing means are in a predetermined position.

The distance between the closing means, measured along the guide pin, may be constant irrespective of the position of the guide pin when moved in translation.

According to another aspect of the present invention, the closing means comprise a first and second valves. The closing means comprise at least one respective valve capable of closing the corresponding aperture.

According to a further aspect of the present invention, the valves are attached to a guide pin which is configured to be movable in translation between a first closed position of the first aperture by the first valve, and a second closed position of the second aperture by the second valve.

According to another aspect of the present invention, the guide pin is a rod on which the valves are positioned. The rod is particularly merged with a central axis of the valves, which corresponds in particular to an axis of symmetry of the valves.

According to another aspect of the present invention, the cavity has a substantially tubular shape, the first and second apertures are positioned at both ends of the tube and the third aperture is formed on a sidewall of the tube.

According to an additional aspect of the present invention, the first aperture of the discharge valve is designed to be connected to a first portion of the discharge duct and/or the second aperture of the discharge valve is designed to be connected to a second portion of the discharge duct. In particular, this second portion of the discharge duct opens into an engine exhaust line.

The present invention further relates to a discharge valve designed to be installed in a discharge duct of an apparatus configured to be driven by a fluid, in particular a turbocompressor driven by the exhaust gases from an engine, said discharge valve having a cavity comprising a first, a second and a third apertures for connection to a respective duct, the discharge valve also comprising first and second closing means of said first and second apertures, respectively, for controlling the communication of the ducts, the closing means being fixed on a guide pin configured to be movable in translation between a first closed position of the first aperture by the first closing means, and a second closed position of the second aperture by the second closing means, the guide pin being integral with a rod, the rod extending perpendicularly to the axis, the rotational drive of the rod causing the translational movement of the guide pin.

The present invention also relates to an orientation device of the exhaust gases at the outlet of the cylinders of an engine, said device comprising:
  a discharge valve designed to be connected to the outlet of at least one first cylinder of the engine,
  a recirculation valve of the exhaust gases designed to be connected to the outlet of at least one second cylinder of the engine,
  a duct linking said valves to each other.

In particular, the first cylinder is a cylinder not dedicated to the recirculation gases, that is to say not directly connected to a circuit for recirculating exhaust gases; the second cylinder is a cylinder dedicated to the recirculation gases, that is to say directly connected to a circuit of recirculation of exhaust gases.

According to another aspect of the present invention, the exhaust gas recirculation valve comprises a body defining:
- a main duct designed to be connected, on the one hand, to the outlet of the at least one second cylinder, and, on the other hand, to a duct for the recirculation of gases, and
- an auxiliary duct opening into said main duct and adapted to be connected to the third aperture of the discharge valve,
- said recirculation valve further comprising means for orientating the exhaust gases of the at least one cylinder configured to, in a first position, allow full recirculation while preventing communication between the main duct and the auxiliary duct and, in a second position, allow closing the main duct in order to establish communication between the main duct and the auxiliary duct.

According to another aspect of the present invention, the closing means of the discharge valve are configured to be opened or closed depending on the configuration of the recirculation valve and/or the engine parameters.

According to an additional aspect of the present invention, the orientation means of the recirculation valve are configured to be positioned based on engine parameters and/or the configuration of the closing means of the discharge valve.

According to another aspect of the present invention, the engine parameters include at least one element among the following parameters:
- the engine speed,
- the pressure at the outlet of the cylinders,
- the engine temperature,
- the level of oxygen at the inlet of the cylinders,
- the gas flow recirculated at the intake.

Other features and advantages of the invention will become apparent from the description which will now be made, in reference to the accompanying drawings which illustrate possible embodiments by way of example and without limitation.

In these drawings:

FIG. 1 shows a diagram of a part of an engine according to an embodiment of the present invention;

FIG. 6 shows a diagram of a discharge valve according to an embodiment of the present invention;

Figure 2:
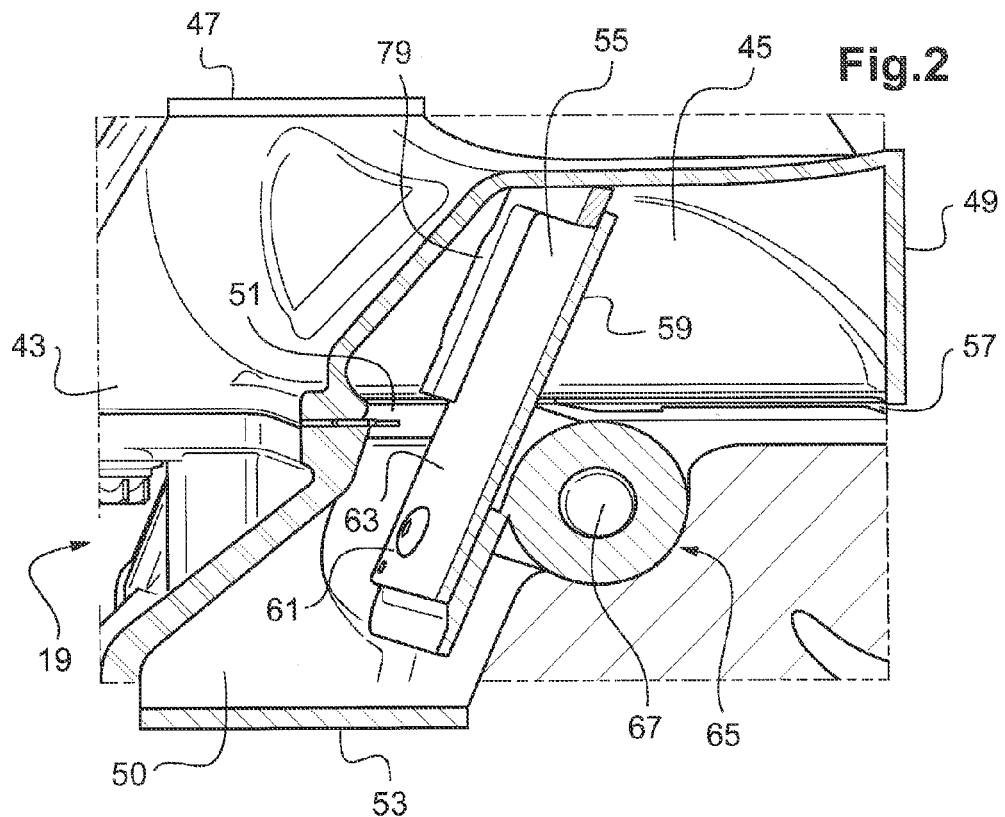
FIGS. 2 and 3 show sectional views of recirculation valves in accordance with embodiments of the present invention.

In these figures, the same reference numerals denote identical elements. Moreover, for references with a number and a letter, the number refers to the class which includes all of the elements, while the letter corresponds to a particular element of this class of elements. For example, the reference 2 refers to all the cylinders, while the reference 2a refers to a particular cylinder.

In the description that follows, the terms listed generally mean:

The term "by-pass" defines the action of diverting a flow of a main circuit by a diversion path in order to avoid an equipment of the main circuit;

The term "cylinder inlet" defines the part of the cylinder where the air supply takes place, for example at the inlet valve of the gases to be burned.

The term "cylinder outlet" defines the part of the cylinder where the evacuation of gases takes place, for example at the gas evacuation valve to evacuate the burnt gases to the exhaust.

The term "exhaust gases" defines the gases burnt and rejected at the cylinder outlet. The exhaust gases can either be directed to the exhaust line, or be recirculated to the inlet of the cylinders, especially in the case of the dedicated cylinder.

The embodiments of the present invention relate in particular to a system 3 for supercharging inlet gases and recirculating exhaust gases.

FIG. 1 shows an engine 1 comprising an example of such a system 3. In the example shown, the engine 1 comprises four cylinders 2, respectively denoted 2a, 2b, 2c and 2d. A cylinder 2d is a cylinder dedicated to the recirculation of gases so that the gases from the cylinder dedicated to the recirculation of gases 2d are recirculated through a recirculation circuit 7 which will be subsequently described in more detail. This gives a total recirculated gas amount very close to 25% in the case of the engine 1 with four cylinders 2, which include a dedicated cylinder 2d, as in FIG. 1.

The system 3 also comprises a supercharging circuit 5 having a turbocompressor 9. The turbocompressor 9 includes, on the one hand, a turbine 11 driven by exhaust gases from the cylinders 2 of the engine and, on the other hand, a compressor 13 driven by the turbine for compressing air to be supplied to the cylinders 2 at the air intake inlet. The supercharging circuit 5 also comprises a discharge duct 15 that allows gases from at least one first cylinder, three in the present example, and corresponding to the non-dedicated cylinders 2a, 2b and 2c, to bypass the turbine 11 of the turbocompressor 9.

The recirculation circuit 7 comprises a recirculation duct 21 configured to direct the gases from the cylinder dedicated to the recirculation gases 2d to the intake.

An orientation device 25 of exhaust gases, connected to the supercharging circuit 5, to the recirculation circuit 7 and to the exhaust line 23 of the engine 1, allows controlling the quantity of gas in communication between the supercharging circuit 5, the recirculation circuit 7 and the exhaust line 23. The orientation device 25 allows, among others, diverting gases from the dedicated cylinder 2d so that they contribute to the drive of the turbine 11 of the turbocompressor 9, or diverting the gases from the non-dedicated cylinders 2a, 2b, 2c so that they contribute to setting the exhaust gas recirculation circuit 7 in full recirculation position.

The device 25 may include a recirculation valve 19 and a discharge valve 17. The discharge valve 17 and recirculation valve 19 are respectively positioned in the discharge duct 15 and the recirculation duct 21. When the discharge valve 17 is open, the gases from non-dedicated cylinders 2a, 2b, 2c passing through the discharge duct 1, can go directly to the exhaust line 23. The recirculation valve 19 is placed at the outlet of at least one second cylinder corresponding to the cylinder dedicated to the recirculation gases 2d. The recirculation valve 19 is configured to direct the gases from the dedicated cylinder 2d either to the intake through the recirculation duct 21, or to the exhaust line 23 through the discharge valve 17.

It should be noted that FIG. 1 represents an exemplary embodiment using the recirculation valve 19 and the discharge valve 17. However, the recirculation circuit 7 and the recirculation valve 19 may be incorporated into a different architecture not including the supercharging circuit 5. In this case, the recirculation valve 19 would be directly connected to the exhaust line 23. Similarly, the discharge valve 17 could be used in a different architecture.

The system 3 may also include a supply air cooler 27, for example a water cooled charged air cooler (WCCAC), which is located at the intake level downstream of the arrival of the recirculation duct 21 and upstream of the cylinders 2. Thus, the cooler 27 cools, firstly, the external gases from the turbocompressor 9, which were heated by the compression experienced at the compressor 13 and, secondly, the recirculated gases from the cylinder dedicated to the recirculation gases 2d, which allows using only a single cooler 27 to cool all the gases received at the input of the cylinders 2.

Furthermore, the use of such a cooler 27 combines the recirculated gases and the external gases so as to feed the cylinders 2 with a homogeneous gas in order for the recirculated gas concentration to be the same for all cylinders 2. To this effect, the cooler 27 may comprise disruptors for distributing the gases around the pipes in which water circulates. These disruptors may, for example, be small fins and thus contribute to achieve a homogeneous mixture at the output of the cooler 27.

The cylinders 2 may also each include an injector 29, for example a multi-port injector, a high-energy ignition coil 31 (which may be common to the different cylinders), and a spark plug 33. The engine 1 may also include a heat exchanger, such as a water gas shift (WGS) catalyst 35 at the recirculation duct 21, a three-way catalyst 37 at the exhaust line 23, a heated exhaust gas oxygen (HEGO) sensor 39 at the outlet of the cylinders 2a, 2b and 2c, and an exhaust gas oxygen sensor 41 at the exhaust line 23.

The overall operation of the system 3 for supercharging the intake gases and recirculating the exhaust gases from the engine 1 will now be described in detail from the diagram of FIG. 1. The outside air is received at the compressor 13 which compresses it when the turbine 11 of the turbocompressor 9 is fed by the exhaust gases at the outlet of the cylinders 2. The air is then sent to the intake through an inlet duct 4. When the turbine 11 is not fed by the exhaust gases at the outlet of the cylinders 2, the outside air is then received at the intake duct without being compressed by the compressor 13.

The air is mixed at the intake with the recirculated gases from the recirculation duct 21 when the orientation device 25 allows recirculation of the exhaust gases. This is particularly the case when the recirculation valve 19 is in the gas recirculation position. The mixture of outside air and recirculated gases is then cooled in the heat exchanger 27, especially to reduce the number of emitted particles. Furthermore, the heat exchanger helps to obtain a homogeneous mixture.

The mixture subsequently arrives at the cylinders 2 where it is mixed with fuel sprayed by the injectors 29, all of which being ignited by the spark plugs 33. Once burnt, the gases are expelled to the outlet of the cylinders 2 to be optionally oriented by the device 25. In particular, at the dedicated cylinder 2d, depending on the position of the recirculation valve 19, the gases from the dedicated cylinder 2d are either totally recirculated to the intake, or entirely directed to the discharge valve 17, or a portion is recirculated and a portion is directed to the discharge valve 17. Depending on the position of the discharge valve 17, the portion of gases originating from the dedicated cylinder 2d and transmitted to the discharge valve 17 is either used for powering the turbine 11 of the turbocompressor 9, or transmitted directly to the exhaust line 23. The gases from the other cylinders 2a, 2b and 2c are either used to power the turbine 11 of the turbocompressor 9, or transmitted directly to the exhaust depending on the configuration of the discharge valve 17.

An example of a recirculation valve 19 according to the invention will now be described in more detail from FIGS. 2 to 5.

The recirculation valve 19 comprises a valve body 43 that defines a main duct 45 connected, on the one hand, to the output of the cylinder dedicated to the recirculation gases 2d via an inlet port 47 and, on the other hand, to the recirculation duct 21 via an outlet port 49. The valve body 43 also describes an auxiliary duct 50 opening into the main duct 45 by a passage window 51.

The recirculation valve 19 further comprises gas orientation means which control the amount of recirculated gases in order to avoid choking the engine 1. The orientation means may comprise a movable flap 55 at the connection point between the main duct 45 and the auxiliary duct 50. However, it should be noted that other orientation means known to the state of the art may also be used, such as a set of valves positioned at the main duct and auxiliary duct.

Figure 3:
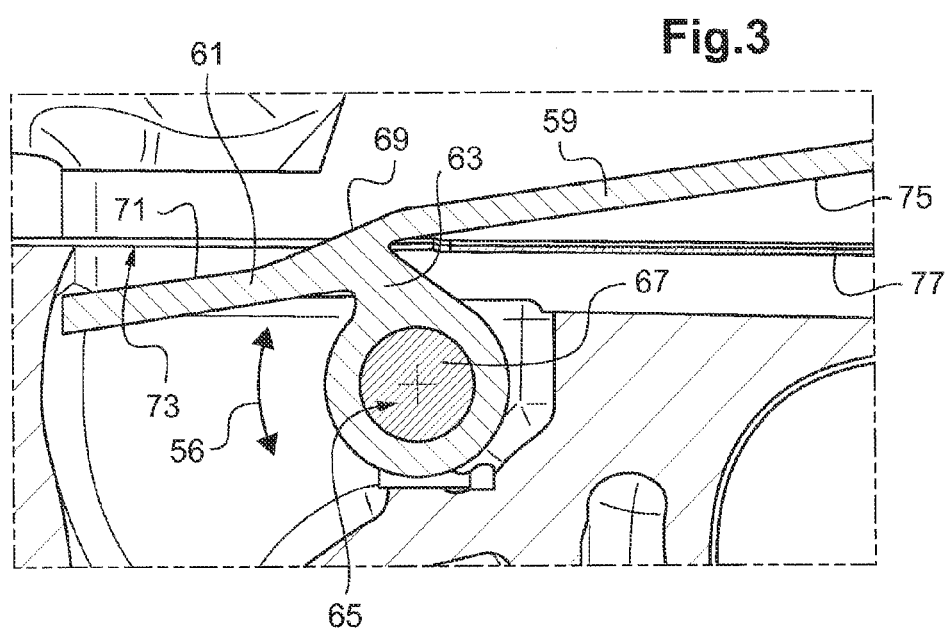
Figure 4:
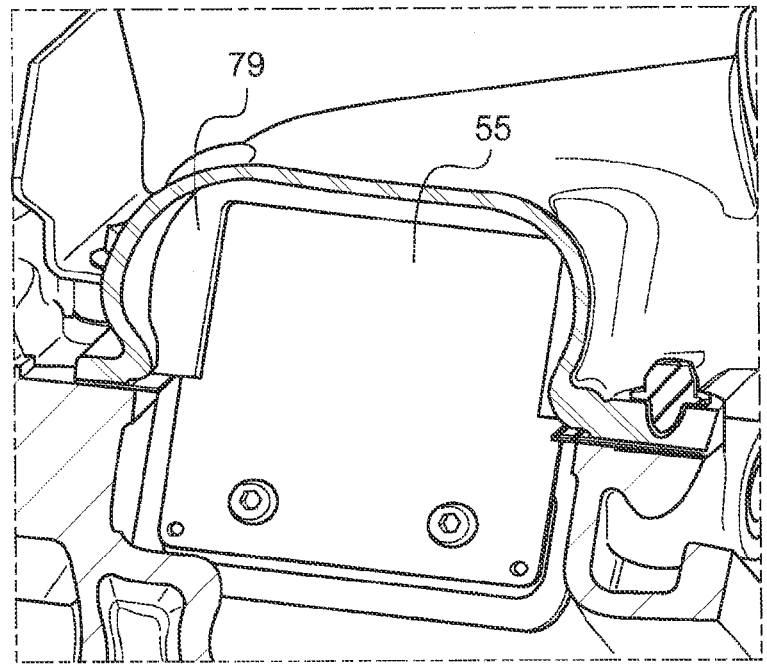
FIG. 4 shows a sectional view of the recirculation valve of FIG. 2, the section being taken parallel to the axis of rotation of the movable flap.
Figure 5:
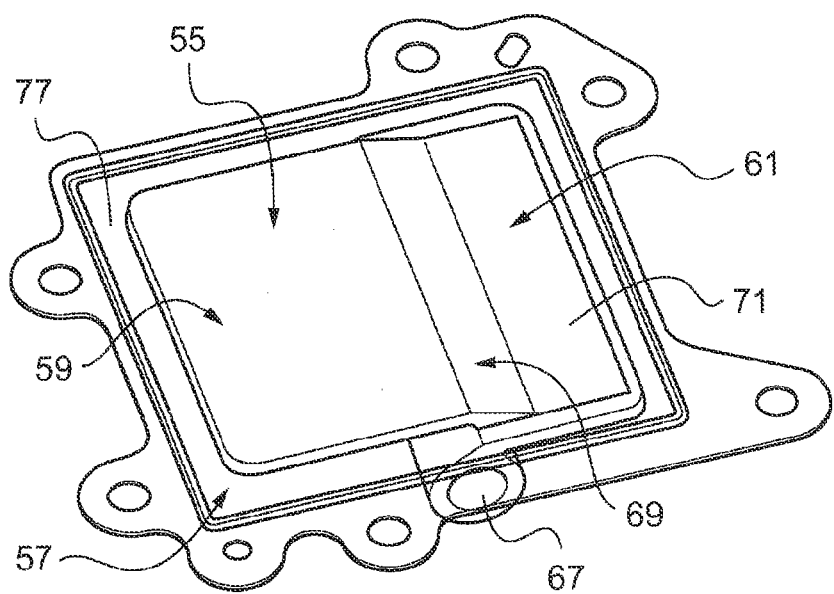
FIG. 5 shows a detailed view of a movable flap and its insertion at the recirculation valve of FIG. 3.

FIGS. 2 and 3 show a sectional view of the recirculation valve 19 in which the section is made along the length of the flap 55, while FIGS. 4 and 5 show front views of flap 55. The movable flap 55 is configured to be able to move in rotation and tilt between a first position of full recirculation and a second position of closure of the main duct 45, as shown in FIG. 2. The movable flap 55 may be located in any intermediate position between the full recirculation position and the closing position of the main duct 45. The rotation of the movable flap 55 is represented by arrow 56 in FIG. 3.

In the full recirculation position, the movable flap 55 closes the passage window 51 and prevents the communication between the auxiliary duct 50 and the main duct 45.

In the closing position of the main duct 45, the upstream portion of the main duct 45, i.e. the portion of the main duct 45 located between the inlet port 47 and the connection with the auxiliary duct 50, is made to communicate with the auxiliary duct 50, while the downstream portion of the main duct 45, i.e. the portion located between the connection with the auxiliary duct 50 and the outlet 49, is closed.

In FIG. 3, the flap 55 is in an intermediate position between the full recirculation position and the closing position of the main duct 45.

A seal 57 presenting an aperture in correspondence with the passage window 51 is arranged at the connection between the main duct 45 and the auxiliary duct 50 to provide sealing between the two ducts 45 and 50 when the movable flap 55 is in the full recirculation position. The seal 57 may be a projecting seal that is held between two flanges and projecting inwards of the ducts 45 and 50. Thus, when the movable flap 55 comes in contact, in the position of full recirculation, with the seal 57, it allows sealing between the two ducts 45 and 50. The use of a tightness seal 57 provides a near 100% tightness in the full recirculation position which allows precisely controlling the amount of recirculated gases. Thus, in the exemplary application shown in FIG. 1, the quasi totality of the gases from the dedicated cylinder 2d is recirculated when the mobile flap 55 is in full recirculation position, and therefore a constant gas recirculation rate is obtained, for example 25% in the case of a four-cylinder engine where one of the cylinders is dedicated to recirculation.

The movable flap 55 has a so-called shutter wing 59 and a diverter wing 61 interconnected by an intermediate area 63, said shutter wing 59 and diverter wing 61 being positioned on either side of the seal 57 while the intermediate area 63 passes through the aperture of the seal 57. The two wings 59 and 61 come into contact with the seal 57 in position of full recirculation. The movable flap 55 also includes, in the vicinity of the intermediate area 63, a pivot pin 65 which allows the rotation of the movable flap between the full recirculation position and the closing position of the main duct 45. The pivot pin 65 is eccentric with respect to the shutter wing 59 and diverter wing 61. The pivot pin 65 is, for example, formed by a pivot shaft 67 which is fixed at its ends and about which the flap 55 is guided in rotation. Alternatively, the pivot pin 65 can be integral with the flap 55 and guided in rotation by bearings located at both ends of the pivot pin 65.

The dimensions of the wings 59 and 61 along the pivot pin 65 of the flap 55 may be different from each other and different from the pivot pin 65 itself. Moreover, in a first embodiment, the shutter wing 59 and the diverter wing 61 may be aligned, as shown in FIGS. 2 and 4, while in a second embodiment shown in FIGS. 3 and 5, the shutter wing 59 and the diverter wing 61 may be parallel but not be aligned, that is to say, belong to different planes to promote sealing at the joint 57. In this second embodiment, the intermediate zone 63 may include a tilt pan 69. Thus, in the full recirculation position, the upper side 71 of the diverter wing 61 comes in contact with a first portion 73 of the seal 57, and the lower side 75 of the shutter wing 59 comes into contact with a second portion 77 of the seal 57.

The main duct 45 may also include a peripheral abutment 79 positioned on the periphery of the main duct 45 at the connection with the auxiliary duct 50d so that, in the closed position of the main duct 45, the shutter wing 59 comes against the peripheral abutment 79. In particular, the abutment 79 is then to the right of the shutter wing 59, the peripheral edges of the three outer sides of the shutter wing 59 being then in contact with the peripheral abutment 79. The presence of the peripheral abutment 79 thus ensures more than 95% sealing between the upstream portion and the downstream portion of the main duct 45 in this position. Substantially all of the gases are then transmitted to the auxiliary duct 50.

The peripheral abutment 79 is attached to the main duct 45, for example, by gluing. In addition, the height of the peripheral abutment 79, that is to say the thickness of the abutment in the main duct 45, will be limited to reduce to the least possible the gas flow in the main duct 45 in the full recirculation position of the flap 55.

At the connection between the main duct 45 and the auxiliary duct 50, the sections of the ducts are, for example, substantially rectangular in the same way as the shutter wing 59 and the diverter wing 61.

The recirculation valve 19 is also provided with means for actuating the moving flap 55 for positioning the movable flap 55 in position of full recirculation or closed position of the main duct 45, or in an intermediate position. The intermediate positions correspond to the positions for which the upstream portion of the main duct 45 is both communicating with the downstream portion of the main duct 45 and with the auxiliary duct 50. Indeed, depending on the configuration and parameters of the engine 1, it may be necessary to recirculate only a portion of gases from the dedicated cylinder 2d to optimize the performance at some actuating points of the engine, the other portion of the gases being oriented to the auxiliary duct, for example to the exhaust. These actuating means comprise, for example, an electric motor and a gear system to control the position of the flap 55 from the electric motor.

Furthermore, the recirculation valve 19 may also include an elastic mechanical means, such as a spring for example, configured to exert a biasing force on the flap 55 towards the closing position of the main duct 45. Thus, in case of non-functioning or failure of the actuating means 55 of the flap 55, said flap 55 is positioned by default in the closing position of the main duct 45, which corresponds to operation without recirculation of exhaust gases and allows actuating correctly the motor at all its actuating points.

The use of such recirculation valve 19 positioned at the outlet of the dedicated cylinder 2d thus allows using a single valve to direct the gases from the dedicated cylinder 2d to the recirculation duct 21 or to the exhaust. The recirculation valve 19 allows authorizing or interrupting the recirculation of exhaust gases from the dedicated cylinder 2d. In the prior art, this function is performed by a valve located upstream of the dedicated cylinder 2d at the intake, which generates problems of depression at the intake and of pumping losses. The position of the recirculation valve 19 at the outlet of dedicated cylinder 2d avoids these problems.

In addition, the use of a peripheral abutment 79 at the main duct 45 provides superior tightness to 95% in the closing position of the main duct 45. This allows, in combined use with the discharge valve 17 which will be described in more detail in the following description, powering the turbine 11 of the turbocompressor 9 with substantially all the gases from the cylinder dedicated to the recirculation gases 2d when the discharge valve 17 is configured to do so.

Finally, configuring the closing means, in particular the flap 55, so that its default position is the closing position of the main duct 45, prevents blocking in full recirculation position in case of failure of the actuating means of the recirculation valve 19.

Furthermore, it should be noted that the embodiments of the present invention are not limited to an engine 1 having four cylinders 2 comprising a dedicated cylinder 2d, but they also include engines having a different total number of cylinders and/or dedicated cylinders. For example, the engine may include two dedicated cylinders whose gases are directed to a recirculation valve 19 common to the two dedicated cylinders or the use of the two recirculation valves 19 to respectively direct the gases from the respective dedicated cylinders. On the other hand, FIG. 1 shows an example of application of the recirculation valve 19. However, the recirculation valve 19 may also be used in other architectures comprising recirculation of gases on a dedicated cylinder.

Figure 7:
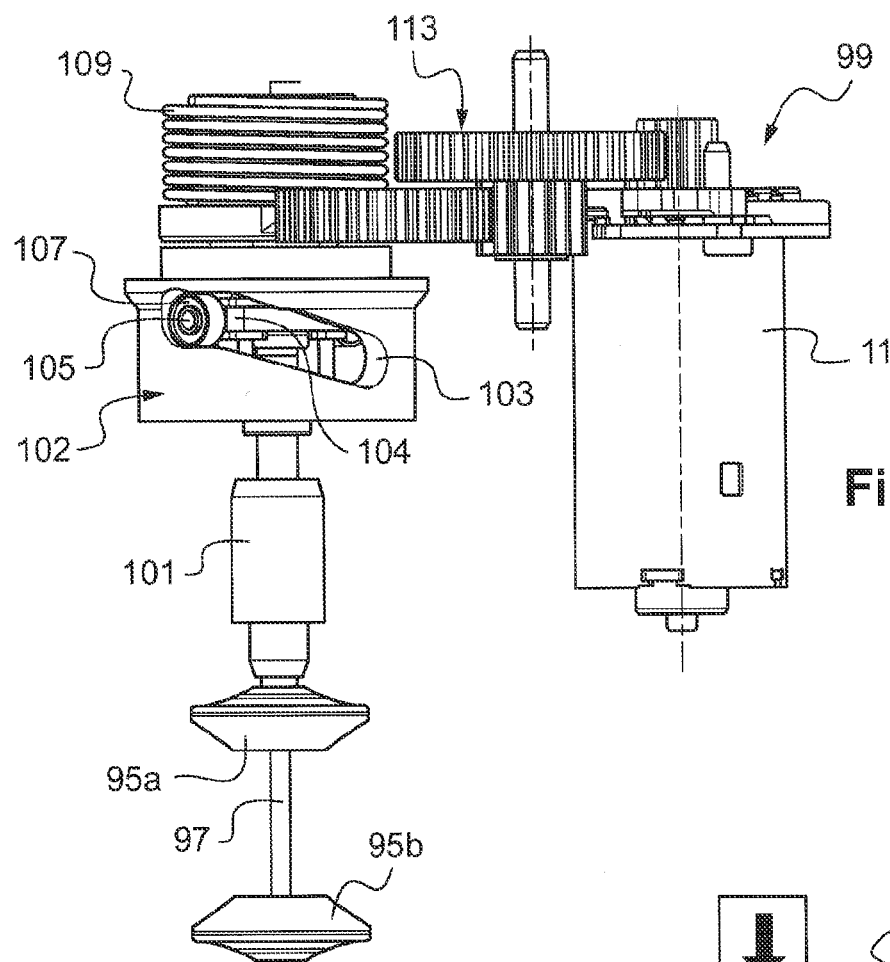
FIG. 7 shows a diagram of an example of means for actuating the closing means of the discharge valve of FIG. 6.

An example of a discharge valve 17 according to the invention will now be described with reference to FIGS. 6 and 7. The discharge valve 17 comprises a body 81 defining a cavity 83, for example of tubular shape, comprising a first 85, a second 87 and a third 89 aperture, each intended to be connected to a respective duct. In particular, the first aperture 85 is located at a first end of the cavity 83. The second aperture 87 is located at the other end of the cavity 83. The third aperture 89 is located on the side wall of the cavity 83. In the specific exemplary application illustrated in FIG. 1, the first aperture 85 is connected to the output of the non-dedicated cylinders 2a, 2b and 2c via the discharge duct 15 of the turbocompressor 9, the second aperture 87 is connected to the exhaust line 23 and the third aperture 89 is connected to the auxiliary duct 50 of the recirculation valve 19.

The discharge valve 17 also includes first closing means 91 and second closing means 93 which can close respectively the first 85 and second 87 apertures so as to control the setting of communication of the ducts connected to the apertures of the discharge valve 17.

The closing means 91 and 93 are realized, for example, by a first 95a and a second 95b valves mounted on a common guide pin 97, as shown in FIG. 6. The guide pin 97 is mobile in translation between a first position in which the first valve 95a closes the first aperture 85, and a second position in which the second valve 95b closes the second aperture 87. The guide pin may also assume an intermediate position in which the first 95a and the second 95b valves do not close the first 85 or the second 87 apertures. Indeed, when the guide pin 97 is in the first position, as illustrated in FIG. 6, the first valve 95a presses against the body wall 81 of the discharge valve 17 to prevent communication between the cavity 83 and the duct connected to the first aperture 85. In the same way, in the second position, the second valve 95b comes into contact with the valve body 81 to prevent communication between the cavity 83 and the duct connected to the second aperture 87. The guide pin 97 is, for example, a rod coinciding with a central axis of the closing means.

A seal may also be placed between the wall of the valve body 81 and the valves 95a and 95b for proper tightness in closed position. The valves 95a and 95b can be made integral with the guide pin 97 or can be mounted on the axis and held in position, for example, via clamps or welds.

The discharge valve 17 may also include actuating means 99 of the guide pin 97 that control the opening or closing of the valves 95. An exemplary embodiment of the actuating means 99 is shown in FIG. 7 with the guide pin 97 and the valves 95a and 95b. The guide shaft 97 is mounted mobile in translation on a fixed bearing 101. The axis 97 is integral in translation with a rod 104, also called T-bar, which extends perpendicularly to the guide pin 97. The T-bar 104 includes a retaining stud 105 and a wheel 107 fixed to its end and mobile in rotation about the T-bar 104. The wheel 107 is inserted in a cam 103 so that the rotation of the T-bar 104 about an axis corresponding with the guide pin 97 causes the movement of the wheel 107 in the cam 10, and causes the translational movement of the axis 97. The rotational movement of the T-bar 104 is controlled by an electric engine 111 through a gear system 113. The rotation of the electric engine drives the rotation of the gear 113 that pivot the T-bar 104. The actuating means may comprise an elastic means configured so that, in the absence of actuation of the engine 109, the T-bar 104 returns to its rest position at one end of the cam 103 corresponding to one of the extreme positions of the guide pin 97, that is to say, either in the closed position of the first aperture 85 of the discharge valve 17, or in the closed position of the second aperture 87 of the discharge valve 17. For example, the return to the rest position is caused by the spring 109 compressed beforehand by the gears 113.

Thus, the rotational driving of the element 104 by the electric engine 111 moves the retaining stud 105 and the wheel 107 along the cam 103 and causes the translational movement of the guide pin 97 between the first and the second positions.

However, embodiments of the present invention are not limited to the actuating means presented above, but to all actuating means known to those skilled in the art.

Moreover, according to an alternative embodiment, the valves 95 may be operated independently from one another. In addition, the valves 95 may also be replaced by flaps that close the first 85 and second 87 apertures.

Such a discharge valve 17 is used to control the communication of the various ducts connected to its apertures 85, 87 and 89. In particular, in the system illustrated in FIG. 1, the discharge valve helps control the orientation of the gases from the different cylinders 2. Thus, when the first closing means 91 close the first aperture 85, the discharge duct 15 is closed and the gases from non-dedicated cylinders 2a, 2b and 2c feed the turbine 11 of the turbocompressor 9. When the first 91 and second 93 closing means leave the first 85 and second 87 apertures open, the ducts connected to the apertures 85, 87 and 89 of the discharge valve 17 are then put into communication. Finally, when the second closing means 93 closes the second aperture 87, the gases from the first aperture 85 may move toward the third aperture 89 or, conversely, the gases from the third aperture 89 may flow to the first aperture 85, one or the other case being determined by the pressure of the different gases at the input of the first 85 and third 89 apertures. However, it should be noted that the applications of the discharge valve 17 are not limited to the architecture shown in FIG. 1 but extend to any discharge duct of a device configured to be driven by a fluid.

The recirculation valve 19 and the discharge valve 17 having been described in details, it is now appropriate to consider an orientation device 25 for the exhaust gases according to the invention, comprising the combination of the two valves 17 and 19. Indeed, in this device 25, both valves 17 and 19 operate in synergy so as to provide additional possibilities for the configuration of the engine and, in particular, for the configuration of the system 3 for supercharging the intake gases and recirculating the exhaust gases in order to optimize its operation.

For example, the closing means 91 and 93 of the discharge valve 17 are configured to be open or closed depending, for example, on the configuration of the recirculation valve 19 and, in particular, depending on the position of the orientation means of said recirculation valve 19. Conversely, the orientation means of the recirculation valve 19 may be positioned according to the positions of the closing means 91, 93 of the discharge valve 17.

The actuating means of the two valves 17, 19 may also be configured to be driven based on the engine 1 parameters. The parameters of engine 1 include, in particular, the engine speed, the engine temperature, the pressure at the outlet of the various cylinders 2, the level of oxygen at the intake of the cylinders 2 or the flow rate of recirculated gases at the intake. These parameters may, for example, be measured by dedicated sensors such as the HEGO sensors 39 and 41, the measures being processed by processing means such as a microcontroller or a microprocessor that manages the different settings of the engine 1. The processing means may be configured to control the actuating means of the valves 17 and 19.

For example, if the orientation means of the recirculation valve 19 are in position of full recirculation, and if the oxygen level at the intake of the cylinders is below a predetermined threshold, the processing means control the orientation means of the recirculation valve 19 so as to shift them into closed position of the main duct 45, or to an intermediate position in order to raise the oxygen level. The closing means 91 and 93 of the discharge valve 17 are also controlled by the processing means to adapt to the position of the orientation means of the recirculation valve 19 and/or also to other parameters of the engine 1. The programming of the processing means is, for example, realized based on tests conducted using different configurations of the system 3 for supercharging the intake gases and recirculating the exhaust gases in the different situations to which the engine may be exposed, and by selecting the best configuration for each situation, the different situations being defined by the different parameters of the engine 1.

It should also be noted that the recirculation valve 19 and discharge valve 17, described previously from FIGS. 2 to 7, are particular examples of the valves of the system 3 for supercharging the intake gases and recirculating the exhaust gases and that the latter may also be configured with different valves allowing the recirculation of exhaust gases and the discharge of the supercharging circuit.

The embodiments of the present invention also relate to a method for controlling the system 3 for supercharging the intake gases and recirculating the exhaust gases of the engine 1. The method relates essentially to the control of the orientation means of the recirculation valve 19 and of the closing means 91 and 93 of the discharge valve 17. The control may be performed based on the parameters of the engine so as to optimize the operation of the engine 1 to support inter alia maximum performance and/or minimal pollution. The orientation and closing means may adopt the various configurations described below and thus control the amount of gases exchanged between the supercharging circuit 5, the recirculation circuit 7 and the exhaust line 23.

Different configurations of the orientation device 25 of the exhaust gases will now be described in detail from FIGS. 8 to 12. In these figures, the arrows show the direction of the gas flow.

Figure 8:
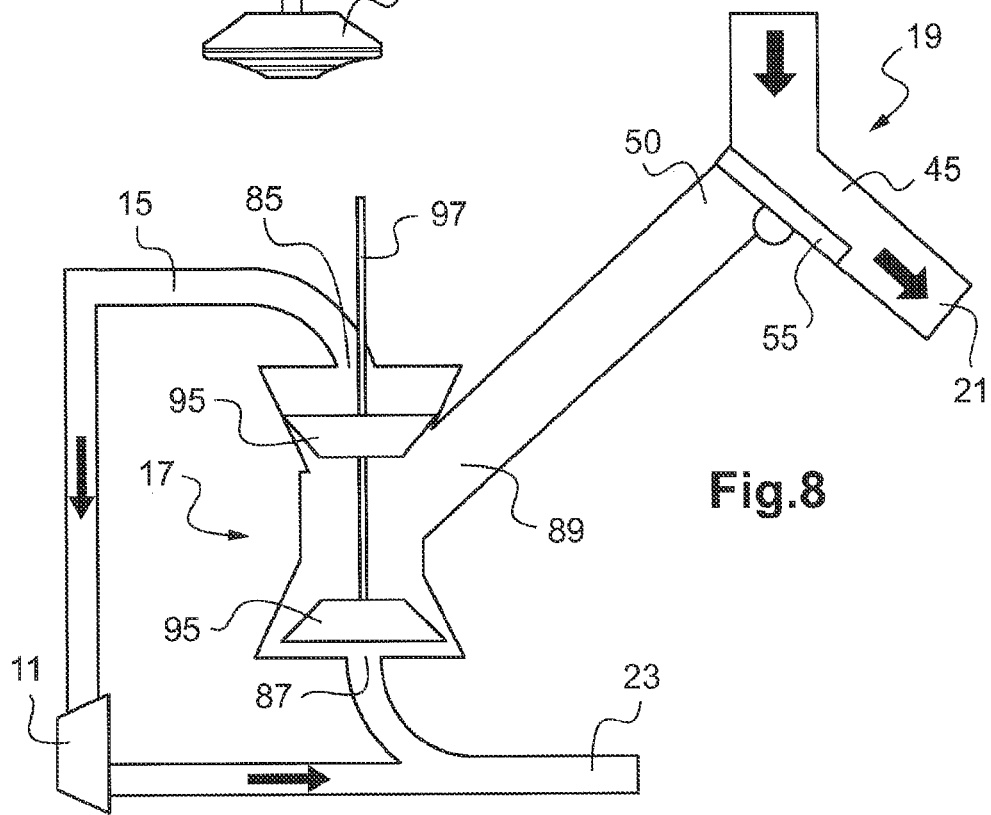
FIGS. 8, 9, 10, 11, 12, 13 and 14 show different configurations of the orientation device of the exhaust gases according to an embodiment of the invention.

FIG. 8 shows a first configuration in which the recirculation valve 19 is in position of full recirculation and the first aperture 85 of the discharge valve 17 is closed by the first closing means 91. Thus, the gas supercharging circuit 5 and recirculation circuit 7 are isolated from each other. The gases from the dedicated cylinder 2d are recirculated towards the intake while the gases from the other cylinders, that is to say the non-dedicated cylinders 2a, 2b and 2c, are oriented towards the turbine 11 of the turbocompressor 9. Such a configuration is used, for example, at low loads accelerations.

Figure 9:
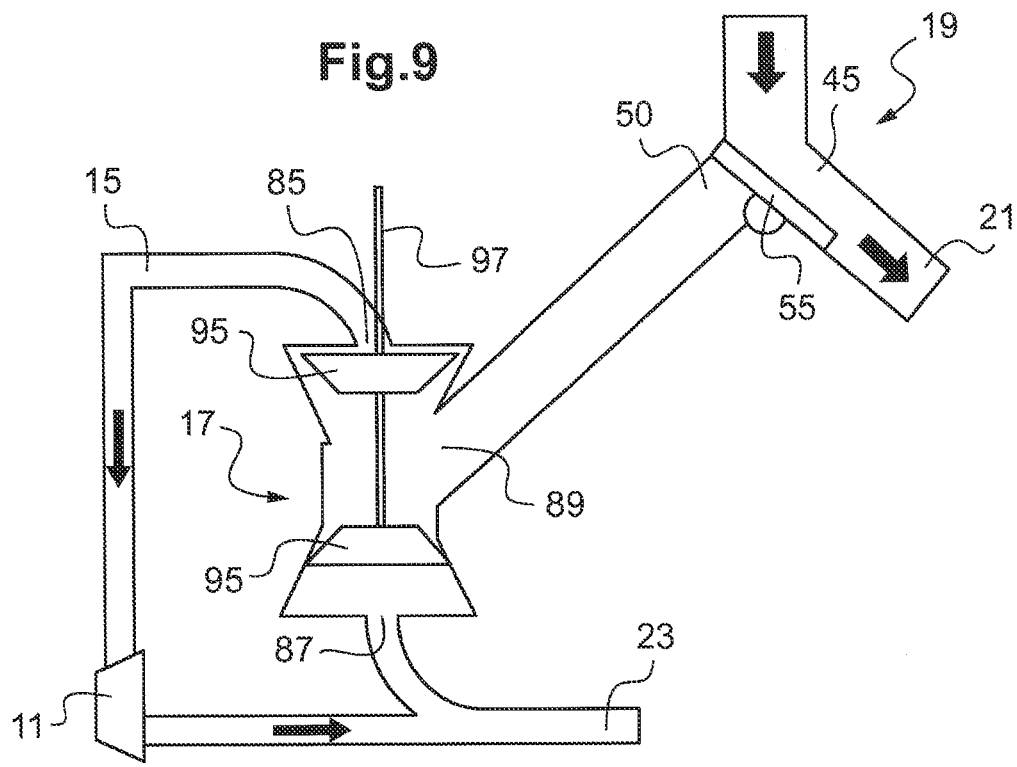

FIG. 9 shows a second configuration in which the recirculation valve 19 is in position of full recirculation, the first aperture 85 of the discharge valve 17 is in the open position, and the second aperture 87 of the discharge valve 17 is in closed position. The gases from the dedicated cylinder 2d are recirculated towards the intake and the gases from the other cylinders 2a, 2b and 2c are oriented towards the turbine 11 of the turbocompressor 9. The difference from the first configuration is that the gases from the other cylinders 2a, 2b and 2c are used to exert pressure on the movable flap 55 of the recirculation valve 19 and thus reduce the effort required by the actuating means of the movable flap 55 to hold the flap 55 in position of full recirculation.

Figure 10:
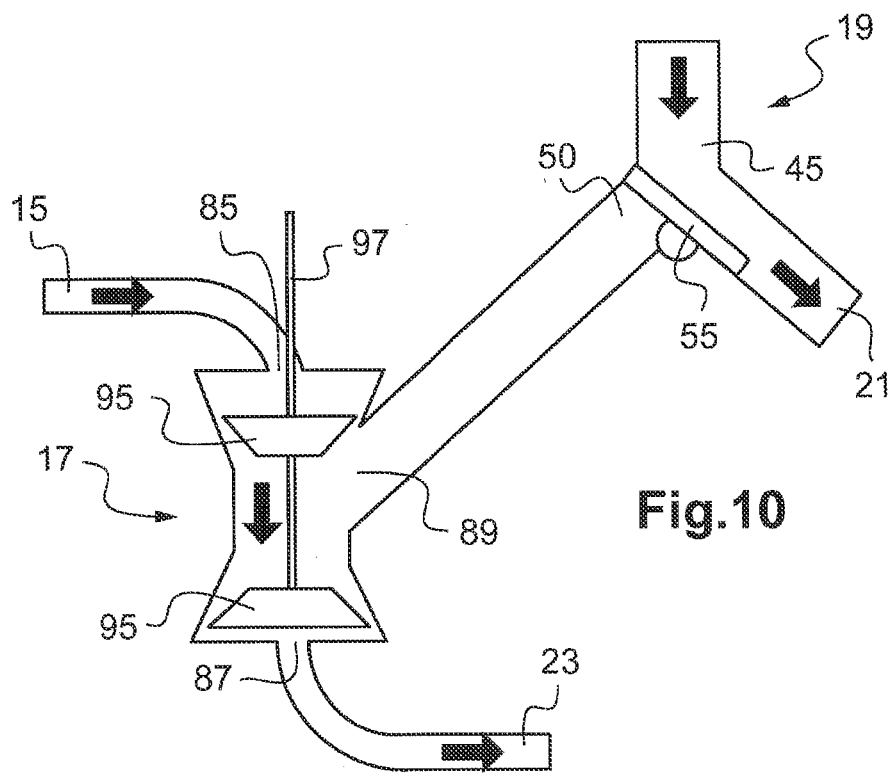

FIG. 10 shows a third configuration in which the recirculation valve 19 is in position of full recirculation and the first 85 and second 87 apertures of the discharge valve 17 are in open position, that is to say that the first and second closing means 95 do not close these apertures 85 and 87. The gases from the dedicated cylinder 2d are then recirculated towards the intake and at least a portion of the gases from the other cylinders 2a, 2b and 2c are sent directly to the exhaust through the discharge duct 15, bypassing the turbine 11 of the turbocompressor 9. Such a configuration may, for example, correspond to an economical mode to reduce to the maximum the consumption and emissions of the engine 1.

Figure 11:
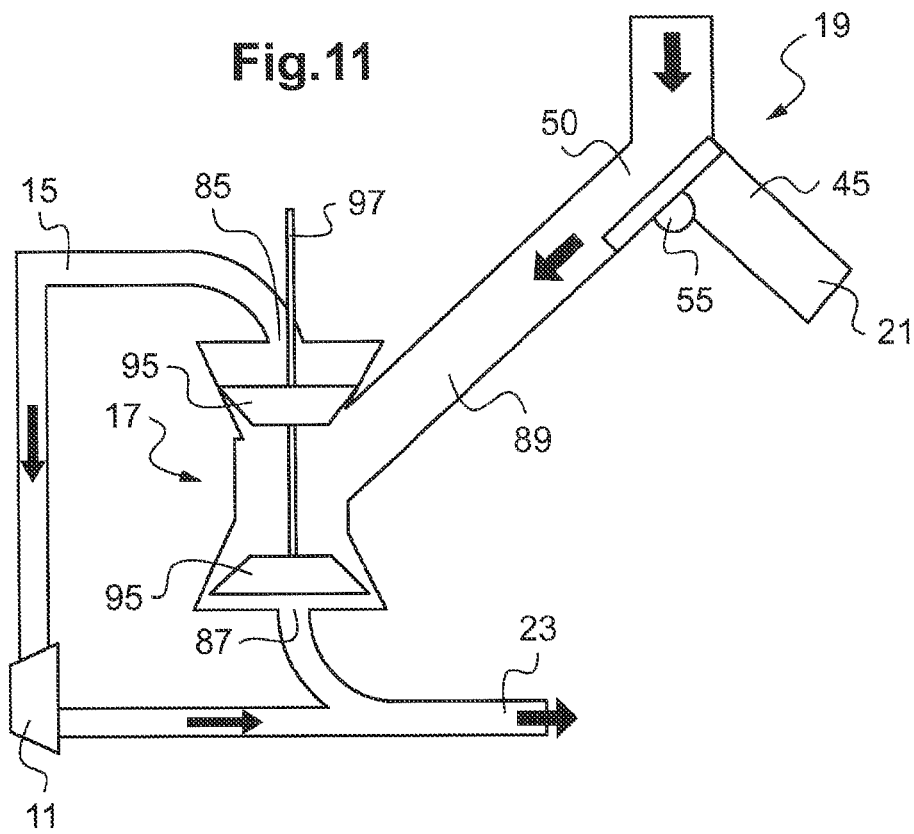

FIG. 11 shows a fourth configuration in which the recirculation valve 19 is in the closed position of the main duct 45, the first aperture 85 of the discharge valve 17 is in the closed position, and the second aperture 87 of the discharge valve 17 is in the open position. Thus, the gas supercharging circuit 5 and recirculation circuit 7 are isolated from each other and the gases from the dedicated cylinder 2d are sent directly towards the exhaust line 23, while the gases from the other cylinders 2a, 2b and 2c are oriented towards the turbine 11 of the turbocompressor 9. Such a configuration can be used, for example, when power is needed but there is a risk of a lack of oxygen at the inlet of the cylinders 2 of the engine when operating at high altitude, for example.

Figure 12:
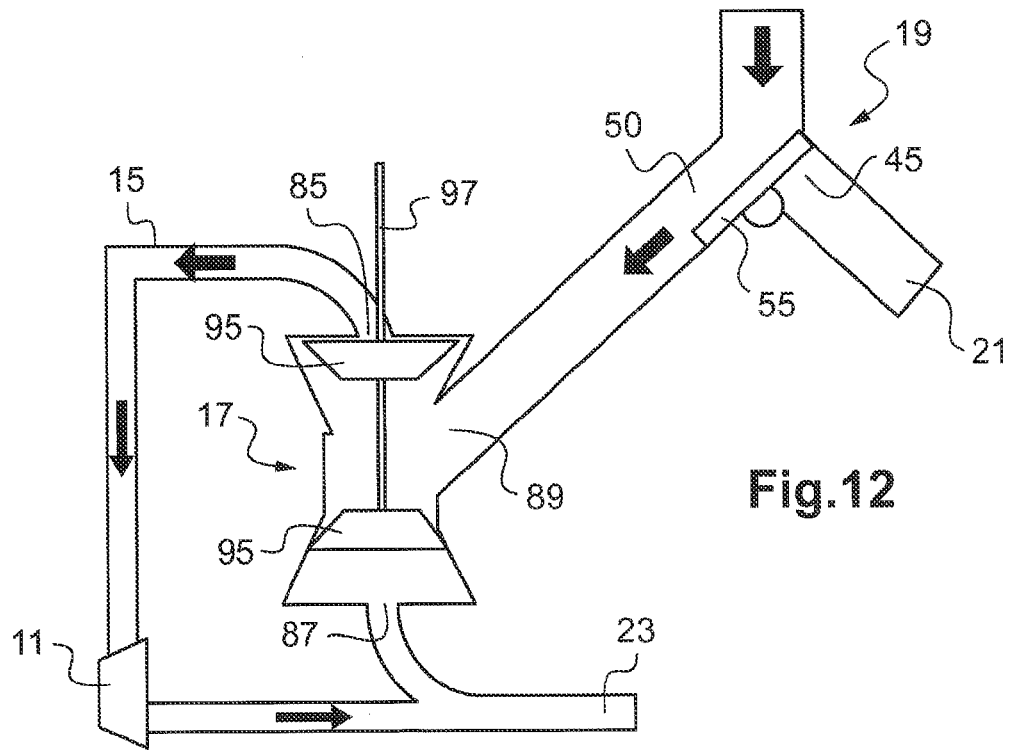

FIG. 12 shows a fifth configuration in which the recirculation valve 19 is in the closed position of the main duct 45, the first aperture 85 of the discharge valve 17 is in the open position and the second aperture 87 of the discharge valve 17 is in closed position. Thus, the gases from all the cylinders 2 are communicated and power the turbine 11 of the turbocompressor 9. Such a configuration may be used cold or when maximum power is sought, for example during heavy accelerations and high engine speed. The configuration of the recirculation valve 19 and discharge valve 17 makes it thus possible to power the turbine 11 of the turbocompressor 9 by the four cylinders 2a, 2b, 2c and 2d, thereby increasing the efficiency of the turbocompressor 9 and avoiding an imbalance which may cause harmful vibrations due to the use of three cylinders 2a, 2b and 2c for supplying the turbine 11 of the turbocompressor 9, particularly when the engine 1 is cold.

Figure 13:
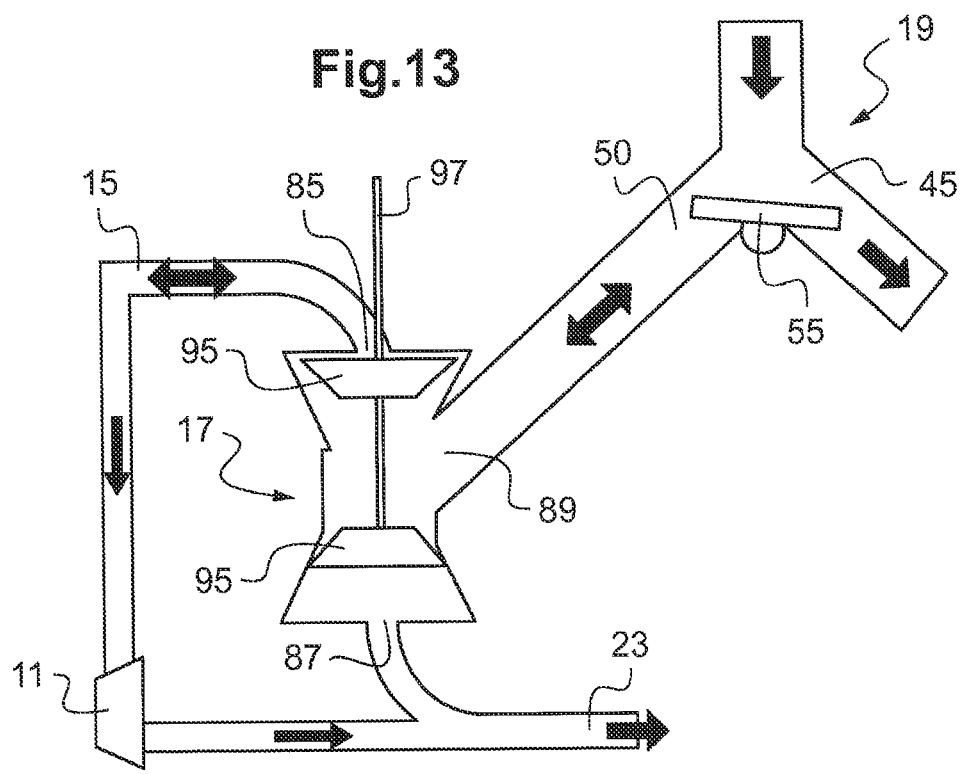
Figure 14:
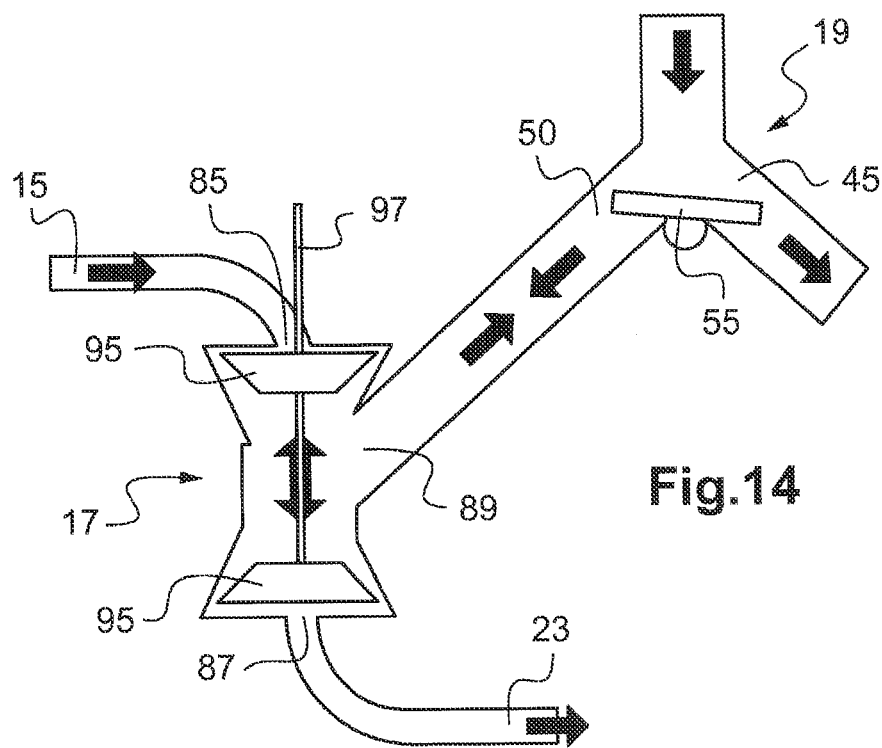

It should be noted that the possible configurations of the gas orientation device 25 are not limited to the previously described configurations, but also extend to configurations where the position of the movable flap 55 is in an intermediate position. The discharge valve 17 may then be configured accordingly in relation to this position of the flap 55 and to the engine 1 parameters. In particular, the configuration shown in FIG. 13, wherein the second aperture 87 of the discharge valve 17 is in closed position and wherein the movable flap 55 is in intermediate position, allows putting in communication the gases from all the cylinders 2 and may enable a supply of the recirculation circuit 7 from the gases from other cylinders 2a, 2b and 2c so as to get a recirculation rate higher than 25%. However, in such a configuration, the distribution of the gases, between the recirculation circuit 7 and the turbine 11 of the turbocompressor 9, depends on the pressure of the gases in the various ducts of the gas orientation device 25. Similarly, FIG. 14 shows a configuration in which the flap 55 is in intermediate position. In this configuration the first 85 and the second 87 apertures are in the open position, which allows communication of the gases from all the cylinders 2 and the exhaust line 23 so that the distribution of the gases between the recirculation and the exhaust is dictated by the pressures of the gases in the various ducts of the orientation device.

Thus, such a system 3 for supercharging the intake gases and recirculating the exhaust gases of the engine 1 makes it possible both to recirculate some of the gases, which allows reducing pollution, and to supercharge the engine 1, which improves performance, while allowing communication of the gases between the supercharging and recirculation circuits.

Thus, the various embodiments of the present invention provide a system 3 for supercharging the intake gases and recirculating the exhaust gases of an engine 1 in which one can control the amount of gas supplied to the supercharge and the amount of gas supplied to the recirculation, especially in terms of the different engine parameters, to suit the different life situations of the engine. According to the required power or the amount of oxygen contained in the fresh air received at intake, for example, the system configuration will be adapted to modify the amount of recirculated gases and the power supply of the turbocompressor and prevent any risk of choking the engine while maximizing performance and minimizing pollution created by the engine 1.

The invention claimed is:

1. An orientation device of exhaust gases at the outlet of cylinders of an engine, said device comprising:
    a discharge valve configured to be connected to an output of at least a first cylinder of the engine,
        the discharge valve being installed in a discharge duct of an apparatus, the apparatus being a turbocompressor configured to be driven by exhaust gases of the engine, said discharge valve comprising:
            a cavity comprising a first, a second and a third aperture for connection to a respective duct;
            first and second closing means of, respectively, said first and second apertures for controlling the establishment of communication of the ducts, the closing means being fixed on a guide pin configured to be movable in translation between a first closed position of the first aperture by the first closing means and a second closed position of the second aperture by the second closing means; and
            an actuating means of the guide pin, the actuating means being able to be rotated and converting this rotational movement into a translational movement of the guide pin;
    a recirculation valve for the exhaust gases configured to be connected to the output of at least a second cylinder of the engine; and
    a duct interconnecting said discharge and recirculation valves.

2. The orientation device according to claim 1, wherein the closing means of the discharge valve comprise a first valve and a second valve.

3. The orientation device according to claim 2, wherein the guide pin of the discharge valve is a rod on which the first and the second valves are positioned.

4. The orientation device according to claim 1, wherein the cavity of the discharge valve has a substantially tubular shape, the first and second apertures being positioned at both ends of the tube, the third aperture being formed on a sidewall of the tube.

5. The orientation device according to claim 1, wherein the first aperture of the discharge valve is intended to be connected to a first portion of the discharge duct and wherein the second aperture of the discharge valve is intended to be connected to a second portion of the discharge duct.

6. The orientation device of exhaust gases according to claim 1, wherein the recirculation valve of the exhaust gases comprises a body defining:
    a main duct to be connected, firstly, to the output of the at least one second cylinder and, secondly, to a gas recirculation duct, and
    an auxiliary duct opening into said main duct and designed to be connected to the third aperture of the discharge valve,
    said recirculation valve further comprising orientation means of the exhaust gases configured to, in a first position, allow full recirculating while preventing communication between the main duct and the auxiliary duct, and, in a second position, to allow closure of the main duct to put in communication the main duct with the auxiliary duct.

7. The orientation device of exhaust gases according to claim 1, wherein the closing means of the discharge valve are configured to be opened or closed depending on the configuration of the recirculation valve and/or the parameters of the engine.

8. The orientation device of exhaust gases according to claim 1, wherein the orientation means of the recirculation valve are configured to be positioned according to the engine parameters and/or the configuration of the closing means of the discharge valve.

9. The orientation device according to claim 7, wherein the engine parameters comprise at least one element among the following parameters:
    the engine speed,
    the pressure at the outlet of the cylinders,
    the engine temperature,
    the level of oxygen to the inlet of the cylinders, and
    the gas flow recirculated at the intake.

* * * * *